(12) United States Patent
Yang et al.

(10) Patent No.: US 8,879,630 B2
(45) Date of Patent: *Nov. 4, 2014

(54) METHOD AND SYSTEM FOR PROCESSING B PICTURES WITH MISSING OR INVALID FORWARD REFERENCE PICTURES

(71) Applicant: Broadcom Corporation, Irvine, CA (US)

(72) Inventors: Zhijie Yang, Beijing (CN); Xuemin Chen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/096,049

(22) Filed: Dec. 4, 2013

(65) Prior Publication Data
US 2014/0112390 A1    Apr. 24, 2014

Related U.S. Application Data

(63) Continuation of application No. 13/484,365, filed on May 31, 2012, now Pat. No. 8,665,954, which is a continuation of application No. 11/871,385, filed on Oct. 12, 2007, now Pat. No. 8,194,741.

(51) Int. Cl.
*H04N 11/02* (2006.01)
*H04N 19/51* (2014.01)
*H04N 19/577* (2014.01)
*H04N 19/44* (2014.01)

(52) U.S. Cl.
CPC ... *H04N 19/00715* (2013.01); *H04N 19/00587* (2013.01); *H04N 19/00721* (2013.01); *H04N 19/00533* (2013.01)

USPC .................................................... 375/240.15

(58) Field of Classification Search
None
See application file for complete search history.

(56) References Cited

U.S. PATENT DOCUMENTS

| | | |
|---|---|---|
| 5,719,646 A | 2/1998 | Kikuchi et al. |
| 6,414,999 B1 | 7/2002 | Igi et al. |
| 7,933,329 B2 | 4/2011 | Venna et al. |
| 8,194,741 B2 | 6/2012 | Yang et al. |
| 8,665,954 B2 * | 3/2014 | Yang et al. ............... 375/240.15 |
| 2003/0112871 A1 | 6/2003 | Demos |
| 2003/0156640 A1 | 8/2003 | Sullivan |
| 2007/0058730 A1 | 3/2007 | Bowra et al. |

* cited by examiner

*Primary Examiner* — Brian Roberts
(74) *Attorney, Agent, or Firm* — Foley & Lardner LLP; Christopher J. McKenna; Daniel E. Rose

(57) ABSTRACT

Methods and systems for processing B pictures with missing or invalid forward reference pictures are disclosed. Aspects of one method may include decoding of a contiguous sequence of B pictures that immediately follow a first I picture after a sequence header. The decoding of the B pictures may handle video edit codes in the AVS1-P2 format and/or random access points. Some embodiments of the invention may discard B pictures that refer to invalid or missing forward reference pictures, while other embodiments of the invention may interpolate B pictures. For an invalid forward reference picture, the interpolation algorithm for generating pictures may use the invalid forward reference picture and the backward reference picture. For a missing decoded forward reference picture, as in a random access, the interpolation algorithm for generating pictures may use the backward reference picture.

20 Claims, 6 Drawing Sheets

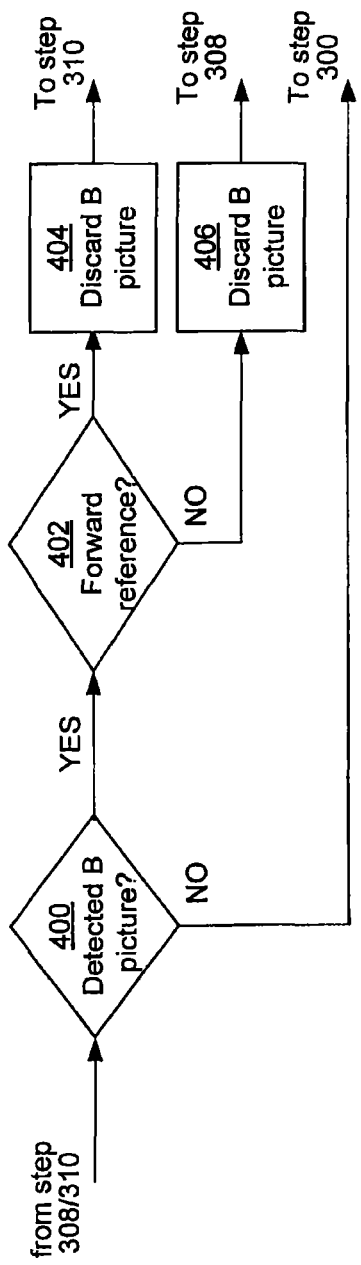
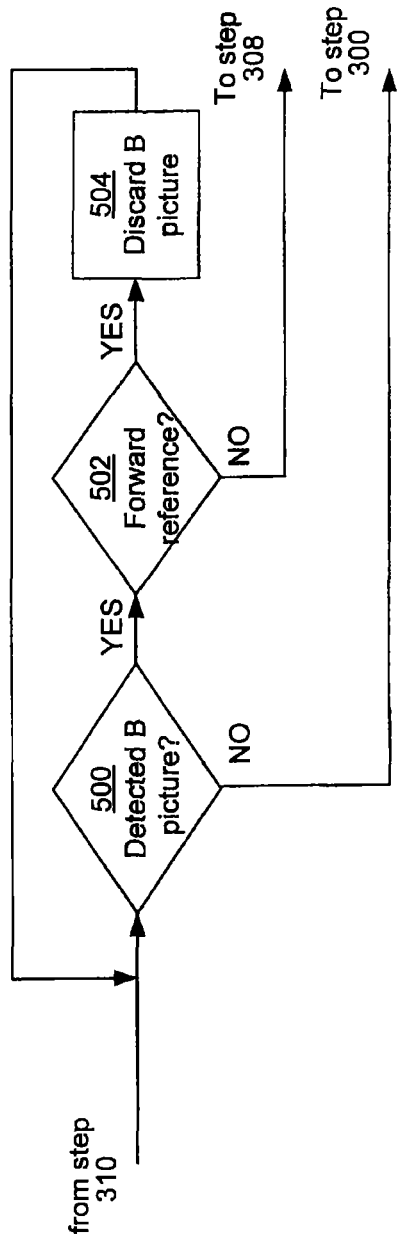
FIG. 4
FIG. 5A (step 310)

METHOD AND SYSTEM FOR PROCESSING B PICTURES WITH MISSING OR INVALID FORWARD REFERENCE PICTURES

CROSS-REFERENCE TO RELATED APPLICATIONS/INCORPORATION BY REFERENCE

The present application is a continuation of, and claims priority to U.S. patent application titled, "METHOD AND SYSTEM FOR PROCESSING B PICTURES WITH MISSING OR INVALID FORWARD REFERENCE PICTURES", having Ser. No. 13/484,365, filed May 31, 2012, and issued as U.S. Pat No. 8,665,954 on Mar.4, 2014; which is a continuation of, and claims priority to U.S. application titled, "METHOD AND SYSTEM FOR PROCESSING B PICTURES WITH MISSING OR INVALID FORWARD REFERENCE PICTURES," having Ser. No. 11/871,385, filed Oct. 12, 2007 and now issued as U.S. Pat. No. 8,194,741 on Jun. 5, 2012. Each of these applications is incorporated by reference herein in its entirety.

MICROFICHE/COPYRIGHT REFERENCE

[Not Applicable]

FIELD OF THE INVENTION

Certain embodiments of the invention relate to processing video data. More specifically, certain embodiments of the invention relate to a method and system for processing B pictures with missing or invalid forward reference pictures.

BACKGROUND OF THE INVENTION

Various video compression methods, including AVS1-P2, may generate data for a present video picture that may indicate differences between the present video picture and reference video pictures. AVS1-P2 is a video standard developed by Audio and Video Coding Standard (AVS) Workgroup of China. The AVS Workgroup was authorized and established by Science and Technology Department of China under National Information Industry Ministry in June, 2002. The role of the group is to establish (or edit) such general technical standards for compression, decoding, processing, and the representation of digital audio-video data. This standard is applied to high-resolution digital broadcast, high-density laser-digital storage media, wireless broad-band multimedia communication, and internet broad-band stream media.

In the AVS1-P2 standard, there are three basic pictures types: Intra (I), Predictive (P), and Bi-predictive (B) pictures. This is basically a nomenclature as well as functionality extension of the I, P, and B picture concept of earlier standards. P picture coding uses the forward picture for the prediction, while B picture coding may use either forward or backward or bi-directional prediction.

Similar to the earlier standards, AVS1-P2 uses sequence header as the random access point (RAP) for features such as channel change. After the sequence header, P pictures can only refer to pictures after that sequence header, while B pictures may refer to pictures before the sequence header. The reference video pictures may be a previous and/or a future video picture temporally with respect to the present picture. However, if a previous video picture that is used as a reference picture is corrupted, the present video picture may not be able to be decoded.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for processing B pictures with missing or invalid forward reference pictures, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 4 is a flow diagram illustrating one of a plurality of display method of B pictures that are missing or invalid forward reference pictures, in accordance with an embodiment of the invention.

FIG. 5A is a flow diagram illustrating one of a plurality of display methods of B pictures that are missing or invalid forward reference pictures, in accordance with an embodiment of the invention.

DETAILED DESCRIPTION OF THE INVENTION

Certain embodiments of the invention may be found in a method and system for processing B pictures with missing or invalid forward reference pictures. Aspects of the invention may comprise decoding of a contiguous sequence of B pictures, where the B pictures may immediately follow a first I picture after a sequence header. The decoding of the B pictures may handle video edit codes, for example, for video data in the AVS1-P2 format, and/or random access points. A video edit code may comprise, for example, information regarding whether following B pictures may have invalid forward reference pictures. Video decoding at a random access point may start, for example, at a sequence header where a forward reference picture may not have been decoded. Accordingly, the forward reference picture may be missing.

Various embodiments of the invention may enable discarding of each of the contiguous sequence of B pictures immediately after a first I picture that follows a sequence header. Other embodiments of the invention may enable determining whether a forward reference picture for each of the contiguous sequence of B pictures may be invalid or missing. If so, the B pictures in the contiguous sequence may be discarded if the B picture indicates that it makes a reference to an invalid or missing forward reference picture. Other embodiments of the invention may interpolate B pictures from the forward and backward reference pictures.

For an invalid forward reference picture, a decoded picture interpolated for a first B picture in the contiguous sequence of two B pictures may be described as (2/3)*(decoded forward reference picture)+(1/3)*(decoded backward reference picture). Similarly, for an invalid forward reference picture, a decoded picture interpolated for a second B picture in the contiguous sequence of B pictures may be described as (1/3)*(decoded forward reference picture)+(2/3)*(decoded backward reference picture). If a decoded forward reference picture is missing, for example, when a random access occurs, the first B picture may be interpolated as (1/3)*(decoded backward reference picture), and the second B picture may be interpolated as (2/3)*(decoded backward reference picture).

This may be generalized to $(m+1-n)/(m+1)$*(decoded forward reference picture)+$n/(m+1)$*(decoded backward reference picture) for each B picture that may reference an invalid forward reference picture and $n/(m+1)$*(decoded backward reference picture) for each B picture that may reference a missing forward reference picture. The parameter 'm' may indicate the number of B pictures in the contiguous sequence of B pictures, and the parameter 'n' may indicate a position of the B picture in the contiguous sequence. For example, a first B picture may have n=1 and a second B picture may have n=2, etc.

Figure 1:
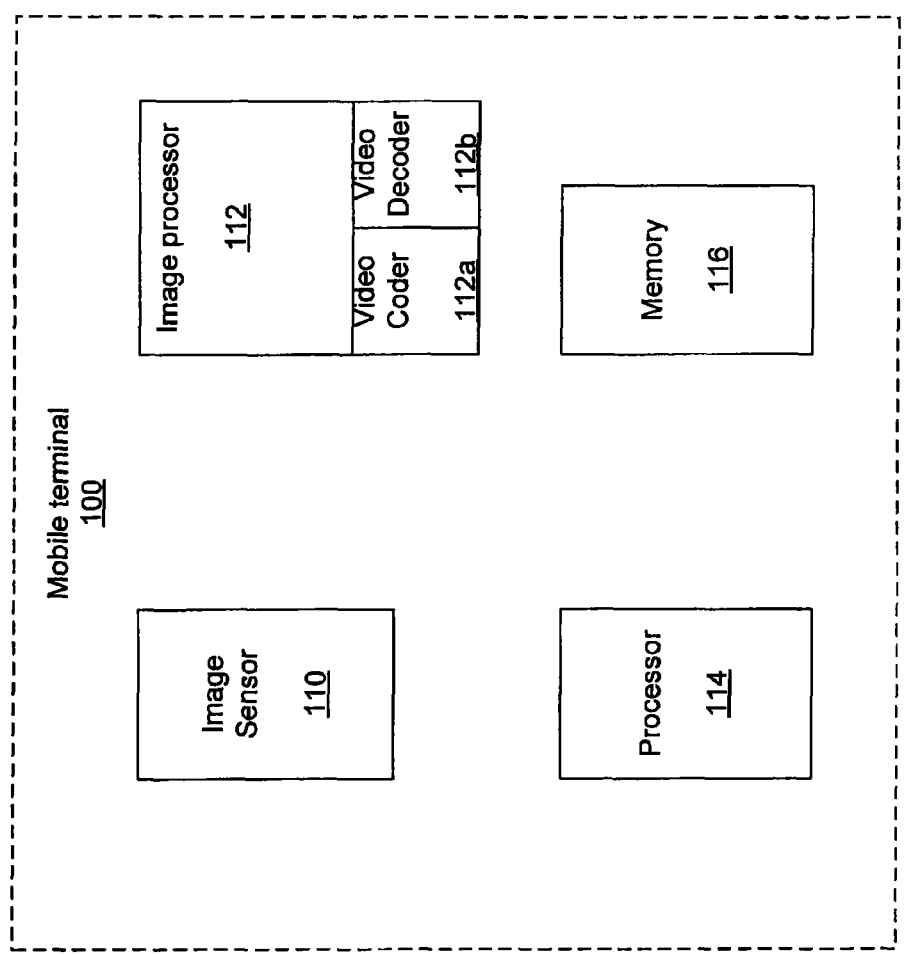
FIG. 1 is an exemplary block diagram of a portion of a mobile terminal, in accordance with an embodiment of the invention.

FIG. 1 is an exemplary diagram of a portion of a mobile terminal, which may be utilized in connection with an embodiment of the invention. Referring to FIG. 1, there is shown a mobile terminal 100. The mobile terminal 100 may comprise an image sensor 110, an image processor 112, a processor 114, and a memory block 116. The image sensor 110 may comprise suitable circuitry and/or logic that may enable capture of light intensity at a plurality of colors, such as, for example, red, green, and blue. The captured light intensity levels may be further processed as video and/or still photograph outputs. These color levels may be converted to the YUV color space, for example, and the resulting image information may be communicated to, for example, the image processor 112 for further processing.

The image processor 112 may comprise suitable circuitry and/or logic that may enable processing of video information. The image processor 112 may comprise a video coder block 112a and a video decoder block 112b. The video coder block 112a may comprise suitable logic, circuitry, and/or code that may enable compressing video data. The video decoder block 112b may comprise suitable logic, circuitry, and/or code that may enable decompressing video data for display. The processor 114 may determine the mode of operation of various portions of the mobile terminal 100. For example, the processor 114 may set up data registers in the image processor block 112 to allow direct memory access (DMA) transfers of video data to the memory block 116. The processor may also communicate instructions to the image sensor 110 to initiate capturing of images. The memory block 116 may be used to store image data that may be processed and communicated by the image processor 112. The memory block 116 may also be used for storing code and/or data that may be used by the processor 114. The memory block 116 may also be used to store data for other functionalities of the mobile terminal 100. For example, the memory block 116 may store data corresponding to voice communication.

In operation, the processor 114 may initiate image capture by the image sensor 110. The image sensor 110 may communicate the video data corresponding to the captured images to the image processor 112. The video coder block 112a in the image processor 112 may, for example, compress the video data for storage and/or communication to another device. The image processor 112 may also decode video data that may be communicated to the mobile terminal 100. Decoding may be achieved via the video decoder block 112b, which may comprise a method for processing B pictures that may be invalid or missing forward reference pictures. Processing of a B picture with an invalid or a missing forward reference picture by the image processor 112 is discussed with respect to FIGS. 2A-6. The video data in the memory block 116 may be further processed by, for example, the processor 114.

Figures 2A, 2B:
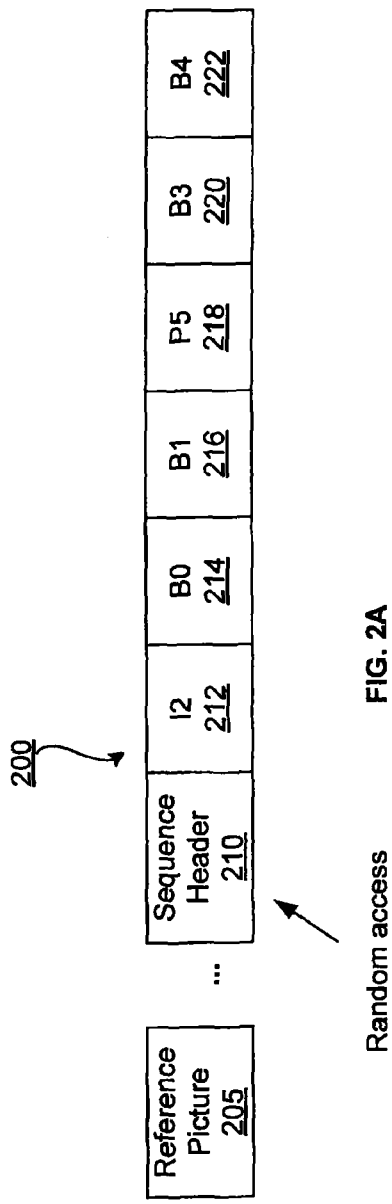
FIG. 2A is a diagram that illustrates random access of video pictures, which may be utilized in connection with an embodiment of the invention.
FIG. 2B is a diagram that illustrates an effect of editing of video pictures, in accordance with an embodiment of the invention.

FIG. 2A is a diagram that illustrates random access of video pictures, which may be utilized in connection with an embodiment of the invention. Referring to FIG. 2A, there is shown an exemplary sequence of video information 200 that may be decoded for display, with a random access point comprising the sequence header 210. Since many video coding standards, including MPEG1, MPEG2, and AVS1-P2, use forward and backward references for generating picture frames, video decoding may be controlled with regard to specific points where decoding of a video may start. For example, some types of video pictures that may be generated by video coding, may comprise an Intra (I) picture, a bi-predictive (B) picture, and a predictive (P) picture.

The I pictures may comprise complete information for displaying a picture. The P picture may comprise information that indicates differences between a preceding I or P reference picture and the present P picture. The B picture may comprise information that indicates differences between a preceding I or P reference picture and the present P picture, as well as a future I or P reference picture and the present P picture. Since a P picture or a B picture may need to refer to a picture that may be displayed after the P or B picture, a coded video file may comprise pictures that may be out of sequence so that a present picture may refer to a future picture that has already been decoded.

With regard to FIG. 2A, the sequence header 210, which may comprise information for decoding the compressed video data, may be the start of the video information 200. The sequence header 210 may comprise, for example, the width and height of the decompressed video picture. The video pictures following the sequence header 210 may be, for example, the I picture 212, the B pictures 214 and 216, the P picture 218, and B pictures 220 and 222. There is also shown a reference picture 205 from a previous video sequence that may serve as a reference, for example, for the B pictures 214 and 216.

Since a picture may need to refer to one or more pictures in the future relative to itself when displayed, the compression methods may compress a future picture and place that picture in a file before the P/B picture referring to it. For example, while the pictures in the sequence of video information 200 may be communicated as the I picture 212, the B picture 214, the B picture 216, the P picture 218, the B picture 220, and the B picture 222, the order that these pictures may be displayed may be different. The pictures may be displayed, for example, as first the B picture 214, then the B picture 216, the I picture 212, the B picture 220, the B picture 222, and the P picture 224.

In some instances, a user of the mobile terminal 100 may indicate that the video should be displayed from a random access point in the video that may not be the start of a video file. For example, the user may wish to view the video from a certain time offset from the beginning of the video. In those instances, video display may involve processing data starting at a sequence header that may be near where the time selected by the user, for example, the sequence header 210. The specific sequence header selected as the random access point may be design dependent. The sequence header may comprise information useful for correct decompression by the video decoder block 112b. The P picture 218 may refer to other pictures in the video sequence 200 after the sequence header 210. However, the B pictures 214 and 216 may also refer to the forward reference picture 205 in a previous video sequence before the sequence header 210, and to the backward reference picture 212.

Accordingly, since a portion of the video to be decompressed may need to reference the reference picture 205, the B pictures 214 and 216 may not be decompressed correctly. However, since a B picture may not serve as a reference to I pictures nor B pictures, any artifacts in the decompressed B pictures 214 and 216 may be limited to those pictures 214 and 216.

FIG. 2B is a diagram that illustrates an effect of editing of video pictures, in accordance with an embodiment of the invention. Referring to FIG. 2B, there is shown exemplary video information 250 that may be decompressed for display. For example, the video information 250 may comprise a first sequence header 260, an I picture 262, B pictures 264 and 266, a P picture 268, B pictures 270 and 272, a video edit code (VEC) 274, a second sequence header 276, an I picture 278, and B pictures 280 and 282. The decompressed pictures for the video information 250 may be displayed with the B picture 264 first, followed by the B picture 266, the I picture 262, the B picture 270, the B picture 272, the P picture 268, the B picture 280, the B picture 282, and the I picture 278.

The sequence headers 260 and 276 and the pictures 262 . . . 272, and 278 . . . 282 may be similar to the corresponding components that are described with respect to FIG. 2A. The VEC 274 may be used by some standards, such as, for example, the AVS1-P2 video standard developed by the Audio and Video Coding Standard Workgroup of China. The VEC, which may be optional, may indicate that there may be invalid or missing forward reference pictures for successive B pictures that immediately follow an I picture. For example, the VEC 274 may indicate that the B pictures 280 and 282 may not be decoded correctly. This may occur, for example, if a portion of the video file, including the pictures 262 . . . 272 may have been edited such that the compression used was different than compression for the following video pictures, or if that portion was deleted. Accordingly, the B pictures 280 and 282 may no longer be able to rely on the forward reference picture 268 for decoding, even though the forward reference picture 268 may be decoded and stored in a picture buffer.

The AVS1-P2 video standard may allow B pictures to use a no_forward_reference flag. The no_forward_reference flag may be asserted if the B picture does not refer to a forward reference picture. If the no_forward_reference flag is not asserted, the B picture may refer to a forward reference picture. Accordingly, by detecting whether the no_forward_reference flag is asserted, the video decoder block 112b may take appropriate actions for cases where the forward reference picture may be invalid or missing. The actions taken are disclosed with respect to FIGS. 3-6.

Figure 3:
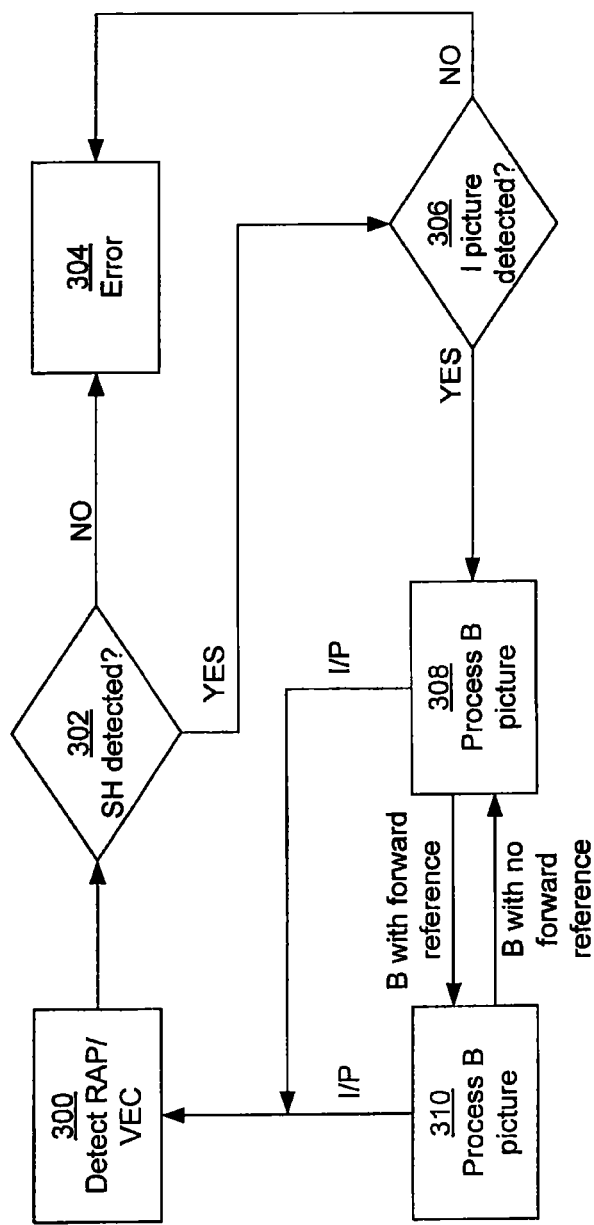
FIG. 3 is a flow diagram illustrating decoding of B-pictures with missing or invalid forward reference pictures, in accordance with an embodiment of the invention.

FIG. 3 is a flow diagram illustrating decoding of B pictures with missing or invalid forward reference pictures, in accordance with an embodiment of the invention. Referring to FIG. 3, there is shown steps 300 to 310. In step 300, a random access may be indicated to the video decoder block 112b, or a VEC such as the VEC 274 may be detected. Step 300 may also be a step where I and/or P pictures may be decoded. In step 302, the video decoder block 112b, which may be able to decode B pictures that have invalid or missing forward reference pictures, may determine if a following start code corresponds to a sequence header. If the following start code does not correspond to a sequence header, the next step may be step 304. If the following start code does correspond to a sequence header, for example, the sequence header 276, the next step may be step 306.

Step 304 may be an error state that may facilitate error handling upon encountering an unexpected start code. The error processing may be design dependent. Accordingly, in step 304, an error handling process may be executed for instances when an expected start code for a sequence header is not detected. In step 306, the video decoder block 112b may determine if the next start code corresponds to an I picture. If so, the I picture may be decoded and the next step may be step 308. Otherwise, the next step may be step 304. In step 304, an error handling process may be executed for the instances when an expected I picture may be invalid or missing.

In step 308, if a B picture is detected, and the no_forward_reference flag is not asserted, the next step may be step 310. If the no_forward_reference flag is asserted, the B picture may be processed. The processing of B pictures is disclosed with respect to FIGS. 4-6. Otherwise, if an I picture and/or a P picture is detected, the next step may be step 300 to process the I and/or P pictures, and to wait for a random access point indication or detection of a VEC.

In step 310, if a B picture is detected, and the no_forward_reference flag is asserted, the next step may be step 308. If the no_forward_reference flag is not asserted, the B picture may be processed. The processing of B pictures where there may not be a valid forward reference picture is disclosed with respect to FIGS. 4-6. Otherwise, if an I picture or a P picture is detected, the next step may be step 300 to process the I and/or P pictures, and to wait for a random access point indication or detection of a VEC.

FIG. 4 is a flow diagram illustrating one of a plurality of display methods of B-pictures, in accordance with an embodiment of the invention. Referring to FIG. 4, there is shown steps 400 to 406, which may be part of the steps 308 and/or 310. In step 400, a determination may be made as to whether a present picture is a B picture. If so, the next step may be step 402. Otherwise, the next step may be step 300. In step 402, a determination may be made as to whether the B picture may refer to a forward reference picture. If so, the next step may be step 404. Otherwise, the next step may be step 406. In step 404, the B picture may be discarded. The next step may be step 310. In step 406, the B picture may also be discarded, however, the next step may be step 308. Accordingly, a contiguous sequence of B pictures immediately after an I frame following a sequence header, such as, for example, the B pictures 280 and 282, may be discarded.

Although two separate states 308 and 310 may be used with this method, various embodiments of the invention may also use a single state that comprises the states 308 and 310 since the B picture may be discarded without regard to whether the B picture refers to a forward reference picture.

FIG. 5A is a flow diagram illustrating one of a plurality of display methods of B pictures that are missing or invalid forward reference pictures, in accordance with an embodiment of the invention. Referring to FIG. 5A, there is shown steps 500 to 504, which may be part of the step 310. In step 500, a determination may be made as to whether a present picture is a B picture. If so, the next step may be step 502. Otherwise, the next step may be step 300. In step 502, a determination may be made whether the B picture may refer to a forward reference picture. If so, the next step may be step 504. Otherwise, the next step may be step 308. In step 504, the B picture may be discarded. Since the B pictures in step 310 may be the B pictures that refer to a forward reference picture, this method may selectively discard those B pictures that may refer to invalid or missing forward reference pictures. For example, the contiguous sequence B pictures immediately after the sequence header, such as, for example, the B pictures 280 and 282, may be discarded if they indicate that they refer to an invalid or missing forward reference picture. Those B pictures that do not refer to forward reference pictures, such as, for example, the B pictures being processed in step 308, may be decompressed and displayed.

Figure 5B:
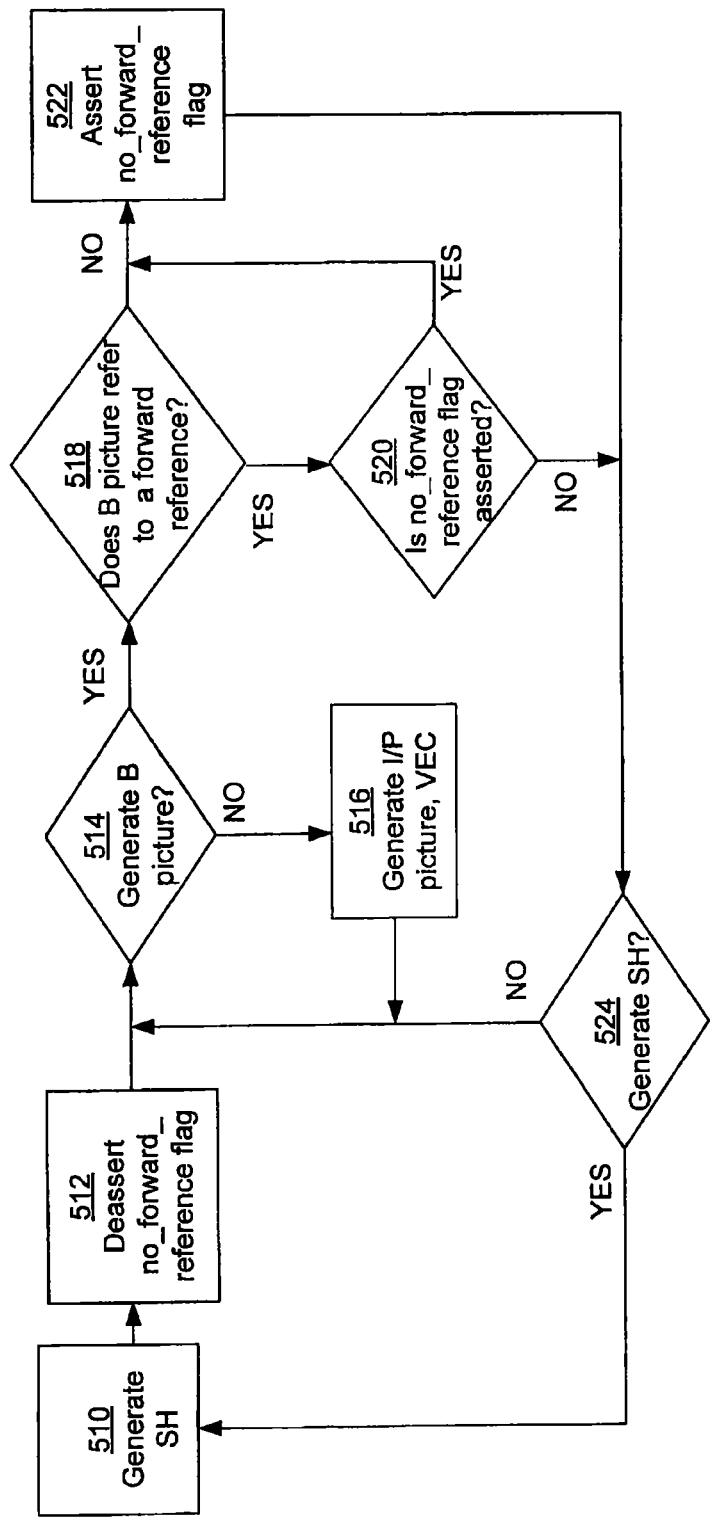
FIG. 5B is a flow diagram illustrating an exemplary coding method that corresponds to one of a plurality of display methods for B pictures that are missing or invalid forward reference pictures, in accordance with an embodiment of the invention.

FIG. 5B is a flow diagram illustrating an exemplary coding method that corresponds to one of a plurality of display methods for B pictures that are missing or invalid forward reference pictures, in accordance with an embodiment of the invention. Referring to FIG. 5B, there is shown steps 510 to 524 that may disclose generation of a non-descending no_forward_reference flag for B pictures. Asserting the no_forward_reference flag in a B picture may indicate, for example, that the B picture may not reference a forward reference picture. For example, if the B picture 280 comprises an asserted no_forward_reference flag, the B picture 280 may be decoded without referring to the P picture 268. Similarly, if the B picture 280 comprises an unasserted no_forward_reference flag, the B picture 280 may need to refer to the P picture 268 for proper decoding. This may alleviate or eliminate judder, for example. Judder may occur during display of the decoded video pictures due to random setting of the no_forward_reference flag in the B pictures. Accordingly, if a B picture in a contiguous sequence of B pictures has asserted the no_forward_reference flag, then a remainder of B pictures in the contiguous sequence of B pictures may also have the no_forward_reference flag asserted.

In step 510, a sequence header for a video sequence may be generated. In step 512, a master no_forward_reference flag may be deasserted in the video coder block 112a. The state of this master flag may also be copied to a no_forward_reference flag that may be in each B picture header. In step 514, if an I picture or a P picture is to be generated, the next step may be step 516. Otherwise, the next step may be step 518. In step 516, the I picture or a P picture may be generated, as appropriate for a video sequence. The next step may be step 514. In step 518, the video coder block 112a, for example, may determine whether the B picture, for example, the B picture 280, may refer to a forward reference picture, such as, for example, the P picture 268. If so, the next step may be step 520. Otherwise, the next step may be step 522.

In step 520, the video coder block 112a, for example, may determine if the master no_forward_reference flag in the video coder block 112a may be asserted. If so, the next step may be step 522. Otherwise the next step may be step 524. In step 522, the no_forward_reference flag in the B picture header may be set to an asserted state. Accordingly, the no_forward_reference flag in the B picture headers may be set to an asserted state once the master no_forward_reference flag is asserted, regardless of whether the B picture refers to a forward reference picture or not. In step 524, if the next data block the video coder block 112a is to generate is a sequence header, the next step may be step 510. Otherwise, the next step may be step 514.

Figure 6:
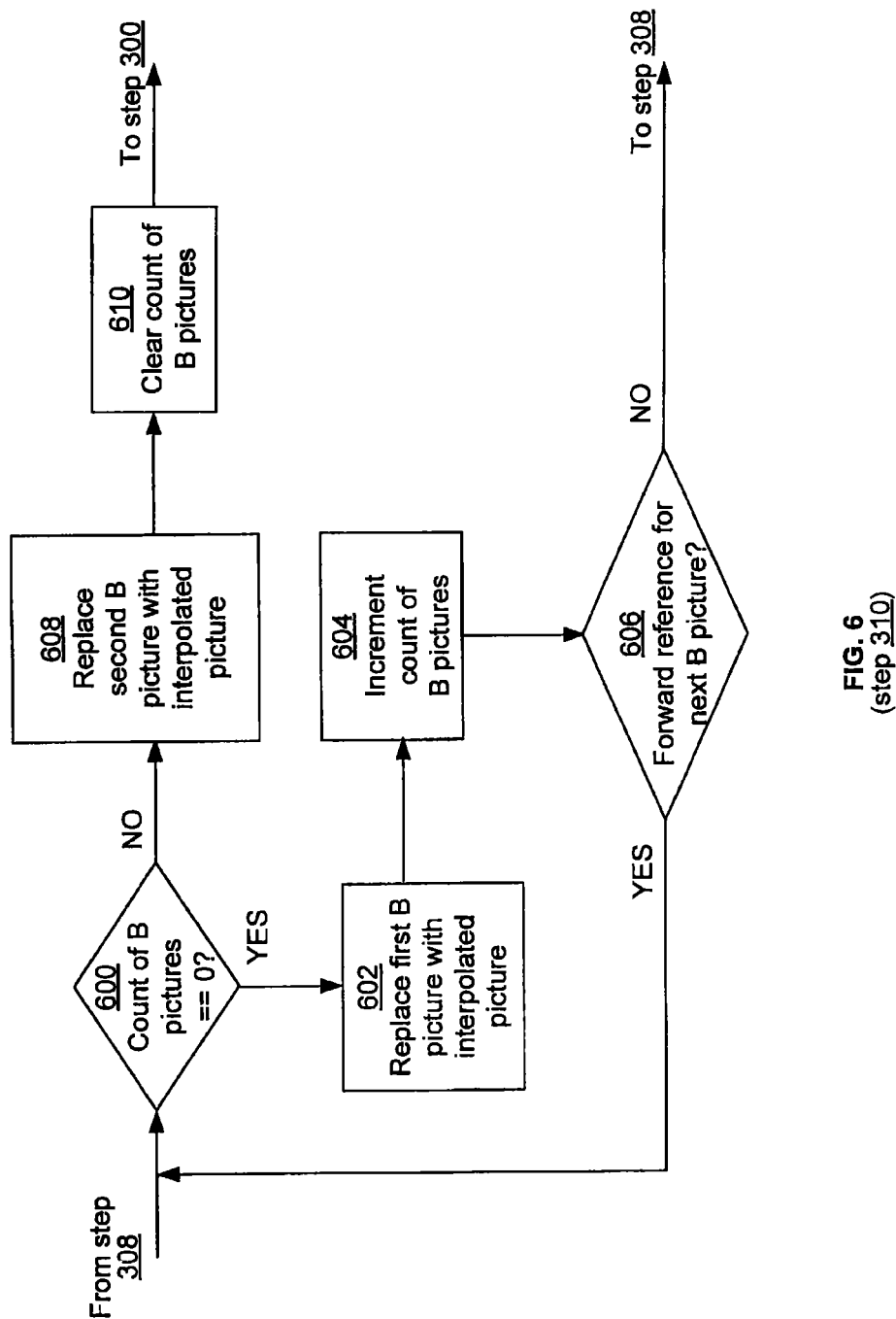
FIG. 6 is a flow diagram illustrating one of a plurality of display methods of B pictures that are missing or invalid forward reference pictures, in accordance with an embodiment of the invention.

FIG. 6 is a flow diagram illustrating one of a plurality of display methods of B pictures that are invalid or missing forward reference pictures, in accordance with an embodiment of the invention. Referring to FIG. 6, there is shown steps 600 to 610, which may be a part of, for example, step 310. The steps 600 to 610 may be exemplary steps that may be used for processing, for example, a video sequence such as those shown with respect to FIG. 2A and/or 2B.

In step 600, a counter that keeps count of B pictures may be checked to see whether the count is equal to zero. If so, the first B picture may be processed in step 602. Otherwise, the second B picture may be processed in step 608. In step 602, the first B picture that may refer to an invalid forward reference picture may be replaced with an interpolated picture appropriate for a first B picture. The interpolation may be design dependent. An exemplary algorithm for replacing the B pictures is described after step 610. If the invalid forward reference picture was used, artifacts may be visible when the B pictures are shown, for example, on a display (not shown) of the mobile terminal 100. In step 604, the counter that keeps count of B pictures may be incremented. In step 606, the next picture, which may be a B picture, may have its header parsed to determine whether the no_forward_reference flag may be asserted. If so, the next step may be step 308. Otherwise, the next step may be step 600.

In step 608, the second B picture that may refer to an invalid forward reference picture may be replaced with an interpolated picture appropriate for the second B picture. In step 610, the counter that keeps count of B pictures may be cleared. The next step may be step 300.

In some instances the first B picture 280 and/or the second B picture 282 after an I picture 278 may be replaced with an interpolated picture. While various interpolation methods may be used, an exemplary interpolation may weight the decoded backward reference picture I2', which may correspond to the I picture 278, and the decoded forward reference picture P5', which may correspond to the P picture 268, to interpolate new B pictures. For example, when the forward reference picture is invalid, as indicated, for example, by the video edit code 274, an exemplary weighting to generate decoded pictures that may correspond to the B0 picture 280 and the B1 picture 282 may be represented by:

$$B0=(2/3)*(P5')+(1/3)*(I2')$$

$$B1=(1/3)*(P5')+(2/3)*(I2').$$

When the decoded forward reference picture is not available, for example, when a random access occurs, an exemplary weighting to generate decoded pictures that may correspond to the B0 picture 280 and the B1 picture 282 may be represented by:

$$B0=(1/3)*(I2')$$

$$B1=(2/3)*(I2').$$

Accordingly, the B pictures may be described as fading in/fading out from the previous video sequence to the present video sequence. The interpolation may be via a processor such as, for example, the processor 114 and/or the image processor 112.

The linear interpolation may be generalized to $(m+1-n)/(m+1)*$(decoded forward reference picture)$+n/(m+1)*$(decoded backward reference picture) for each B picture that may reference an invalid forward reference picture, and n/(m+1)*(decoded backward reference picture) for each B picture that may reference a missing forward reference picture. The parameter 'm' may indicate the number of B pictures in the contiguous sequence of B pictures, and the parameter 'n' may indicate a position of the B picture in the contiguous sequence. For example, with respect to the contiguous sequence of B pictures 280 and 282 in FIG. 2B, the parameter m may equal 2, the B picture 280 may have n=1, and the B picture 282 may have n=2.

Accordingly, by appropriately handling video files that comprise sequence headers, and/or video files that comprise video edit codes, various embodiments of the invention may display video information without generating artifacts in instances where B pictures may not have valid forward reference pictures.

In accordance with an embodiment of the invention, aspects of an exemplary system may comprise, for example, the image processor 112 that comprises the video coder block 112*a* and the video decoder block 112*b*. The video decoder block 112*b* may enable decoding of a contiguous sequence of B pictures, for example, the B pictures 280 and 282, that immediately follow a first I picture, for example, the I picture 278, after a sequence header, for example, the sequence header 276, in compressed video data. The video decoder block 112*b* may handle video edit codes, for example, in video data in the AVS1-P2 format and/or random access points. In some exemplary embodiments of the invention, the video decoder block 112*b* may, for example, discard the contiguous sequence of B pictures 280 and 282.

In other embodiments of the invention, the video decoder block 112*b* may be able to determine whether a forward reference picture, for example, the P block 268, for the B pictures 280 and 282 may be invalid or missing. This may be determined, for example, by determining whether the no_forward_reference flag may be asserted. The no_forward_reference flag, when asserted, may indicate that there is no forward reference for that B picture. The no_forward_reference flag may be part of each picture compressed using a standard, such as, for example, the AVS1-P2 standard. The video decoder block 112*b* may, for example, discard of each of B picture in the contiguous sequence of B pictures if the B picture indicates a reference to the invalid or missing forward reference picture.

Various embodiments of the invention may generate, for example, the B pictures 280 and 282 via the video coder block 112*a*. An embodiment of the invention may enable the video coder block 112*a* such that, for example, if the B picture 280 is generated with the no_forward_reference flag asserted, the B picture 282 may also have the no_forward_reference flag asserted. This may reduce, for example, artifacts during decoding of the compressed pictures. While the B pictures 280 and 282 may have been used as an example, this algorithm may be used for other video sequences that may generate more than two contiguous B pictures. Accordingly, when the no_forward_reference flag is asserted for a B picture in a contiguous sequence of B pictures, where the contiguous sequence of B pictures may be generated after a first I picture is generated after a sequence header, the no_forward_reference flag for each of the remainder of the B pictures in the contiguous sequence of B pictures may be asserted.

In instances where, for example, the B picture 280 indicates, for example, via the asserted no_forward_reference flag, that a reference is made to a forward reference picture, for example, the P picture 268, the B picture 280 may not be decoded correctly since, for example, the VEC 274 may indicate that the P picture 268 may not be a valid forward reference picture for the B pictures 280 and 282. Accordingly, rather than make a reference to the P picture 268, or drop the B pictures 280 and/or 282, an interpolated, decoded picture may be generated, where the interpolation may be linear or non-linear. The interpolation may be made via, for example, the video coder block 112*a* in the image processor 112, and/or the processor 114.

Some embodiments of the invention may use a linear interpolation that may be described by the following examples for the B pictures 280 and 282. For example, when a decoded forward reference picture is available but is invalid, a linear interpolation of the B picture 280 may be described as (⅔)*(decoded forward reference picture)+(⅓)*(decoded backward reference picture). Similarly, the linear interpolation of the B picture 282 may be described as (⅓)*(decoded forward reference picture)+(⅔)*(decoded backward reference picture).

When the decoded forward reference picture is not available, for example, when a random access occurs, a linear interpolation of the B picture 280 may be described as (⅓)*(decoded backward reference picture) and the linear interpolation of the B picture 282 may be described as (⅔)*(decoded backward reference picture). Accordingly, these interpolations of the B pictures 280 and 282 may be similar to a fade in/fade out process.

The linear interpolation may be generalized to (m+1−n)/(m+1)*(decoded forward reference picture)+n/(m+1)*(decoded backward reference picture) for each B picture that may reference an invalid forward reference picture, and n/(m+1)*(decoded backward reference picture) for each B picture that may reference a missing forward reference picture. The parameter 'm' may indicate the number of B pictures in the contiguous sequence of B pictures, and the parameter 'n' may indicate a position of the B picture in the contiguous sequence. For example, with respect to the contiguous sequence of B pictures 280 and 282 in FIG. 2B, the parameter m may equal 2, the B picture 280 may have n=1, and the B picture 282 may have n=2.

Various embodiments of the invention may comprise decoding compressed video via, for example, the video decoder block 112*b*, which may be described by a flow diagram as disclosed with respect to FIG. 3. Accordingly, there may be a transition from a first state, or step 300, to a second state, or step 302, when a random access or a video editing code is detected. There may be a transition from the second state to a third state, or step 306, when a sequence header is detected. When some other data block is detected in the second state, such as, for example, an I picture, a P picture, a B picture, or a video edit code, there may be a transition to an error state, or step 304.

There may be a transition from the third state to a fourth state, or step 308, when an I picture is detected. When some other data block is detected in the third state, such as, for example, a P picture, a B picture, a video edit code, or a sequence header, there may be a transition to the error state. There may be a transition from the fourth state to a fifth state, or step 310, when a B picture that has a reference to a forward reference picture is detected. When an I picture or a P picture is detected, there may be a transition from the fourth state to the first state. There may be a transition from the fifth state to the fourth state when a B picture that does not reference a forward reference picture is detected. When an I picture or a P picture is detected, there may be a transition from the fifth state to the first state.

Various embodiments of the invention may enable the video decoder block 112*b* to discard B pictures in the fourth and fifth states. Accordingly, this method may discard a contiguous sequence of B pictures immediately after a first I picture that follows a sequence header. Other embodiments of the invention may enable the video decoder block 112*b* to discard B pictures in the fifth state. Accordingly, this method may discard B pictures in a contiguous sequence of B pictures immediately after a first I picture that follows a sequence header when the B pictures make a reference to a forward reference picture.

Other embodiments of the invention may interpolate decoded pictures that may correspond to a contiguous sequence of B pictures immediately after a first I picture that follows a sequence header. An exemplary contiguous sequence of B pictures may comprise two B pictures, such as, for example, the B pictures 280 and 282, which may make references to a forward reference picture, for example, the P picture 268, and to a backward reference picture, for example, the I picture 278. The interpolated picture that may correspond to the B picture 280 may be generated when a decoded forward reference picture is available, but is invalid, using, for example, the following algorithm: (⅔)*(decoded forward reference picture)+(⅓)*(decoded backward reference picture). Similarly, the interpolated picture that may correspond to the B picture 282 may be generated using, for example, the following algorithm: (⅓)*(decoded forward reference picture)+(⅔)*(decoded backward reference picture).

When the decoded forward reference picture is not available, for example, when a random access occurs, a linear interpolation of the B picture 280 may be described as (⅓)*(decoded backward reference picture) and the linear interpolation of the B picture 282 may be described as (⅔)*(decoded backward reference picture). Accordingly, these interpolations of the B pictures 280 and 282 may be similar to a fade in/fade out process.

The linear interpolation may be generalized to (m+1−n)/(m+1)*(decoded forward reference picture)+n/(m+1)*(decoded backward reference picture) for each B picture that may reference an invalid forward reference picture, and n/(m+1)*(decoded backward reference picture) for each B picture that may reference a missing forward reference picture. The parameter 'm' may indicate the number of B pictures in the contiguous sequence of B pictures, and the parameter 'n' may indicate a position of the B picture in the contiguous sequence. For example, with respect to the contiguous sequence of B pictures 280 and 282 in FIG. 2B, the parameter m may equal 2, the B picture 280 may have n=1, and the B picture 282 may have n=2.

Another embodiment of the invention may provide a machine-readable storage, having stored thereon, a computer program having at least one code section executable by a machine, thereby causing the machine to perform the steps as described above for processing B pictures with missing or invalid forward reference pictures.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will comprise all embodiments falling within the scope of the appended claims.

What is claimed is:

1. A method comprising:
   in response to receiving a sequence header within compressed video data, determining whether a contiguous sequence of predicted pictures immediately follows a random access point within the compressed video data; and
   decoding the contiguous sequence of predicted pictures based on the determination, wherein the decoding handles an editing point;
   wherein the decoding further comprises decoding the contiguous sequence of predicted pictures based on a status of a forward reference picture indicated by at least one predicted picture among the contiguous sequence of predicted pictures.

2. The method according to claim 1, comprising discarding a predicted picture among the contiguous sequence of predicted pictures that is determined to immediately follow the random access point.

3. The method according to claim 1, comprising discarding a predicted picture when the contiguous sequence of predicted pictures references a forward reference picture that is one of: invalid or missing.

4. The method according to claim 1, further comprising interpolating decoded pictures that correspond to the contiguous sequence of predicted pictures when the contiguous sequence of predicted pictures indicates a reference to the forward reference picture that is one of: invalid or missing.

5. The method according to claim 4, further comprising replacing a predicted picture that references the forward reference picture with an interpolated picture, the predicted picture being among the contiguous sequence of predicted pictures.

6. The method according to claim 4, wherein the interpolation uses the following algorithm when the forward reference picture is invalid and is available:

$$((m+1-n)/(m+1))*(\text{decoded forward reference picture})+(n/(m+1))*(\text{decoded backward reference picture}),$$

wherein the parameter 'm' is a number of predicted pictures in the contiguous sequence of predicted pictures, and the parameter 'n' is a sequence position.

7. The method according to claim 1, wherein the determining further comprises determining whether the random access point is a first random access point that occurs after the sequence header.

8. A system comprising:
- at least one circuitry configured to determine whether a contiguous sequence of predicted pictures immediately follows a random access point after a sequence header within compressed video data;
- wherein the at least one circuit is further configured to decode the contiguous sequence of predicted pictures based on the determination of whether the contiguous sequence of predicted pictures immediately follows the random access point after the sequence header, wherein the decoding is based on information indicating an editing in the compressed video data; and
- wherein the at least one circuit is further configured to determine whether the random access point is a first random access point that occurs after the sequence header.

9. The system according to claim 8, wherein the at least one circuit is further configured to discard the contiguous sequence of predicted pictures that are determined to immediately follow the first random access point.

10. The system according to claim 8, wherein the at least one circuit is further configured to discard a predicted picture among the contiguous sequence of predicted pictures when the predicted picture references a forward reference picture that is one of: invalid or missing.

11. The system according to claim 8, wherein the one or more circuits further enable decoding the contiguous sequence of predicted pictures based on a status of one or more forward reference pictures indicated by the contiguous sequence of predicted pictures.

12. A method comprising:
- in response to detecting an editing point in compressed video data and further in response to detecting a sequence header within the compressed video data, determining whether a contiguous sequence of predicted pictures immediately follows a first random access point within the compressed video data; and
- decoding the contiguous sequence of predicted pictures based on the determination to generate decoded pictures.

13. The method according to claim 12, wherein the decoding further comprises decoding the contiguous sequence of predicted pictures based on a status of a forward reference picture indicated by the contiguous sequence of predicted pictures.

14. The method according to claim 13, further comprising applying a weighting to generate the decoded pictures in response the forward reference picture being invalid.

15. The method according to claim 12, wherein determining further comprises determining whether the random access point is a first random access point that occurs after the sequence header.

16. The method according to claim 12, comprising interpolating the decoded pictures when a predicted picture among the contiguous sequence of predicted pictures references a forward reference picture that is one of: invalid or missing.

17. The method of claim 16, further comprising replacing the predicted picture that references the forward reference picture with an interpolated picture.

18. The method according to claim 16, further comprising determining whether the forward reference picture is invalid and available.

19. The method according to claim 18, wherein the interpolation uses the following algorithm when the forward reference picture is invalid and is available:

$$((m+1-n)/(m+1))*(\text{decoded forward reference picture})+(n/(m+1))*(\text{decoded backward reference picture}),$$

wherein the parameter 'm' is a number of predicted pictures in the contiguous sequence of predicted pictures, and the parameter 'n' is a sequence position.

20. The method according to claim 12, further comprising discarding a predicted picture among the contiguous sequence of predicted pictures in response to the predicted picture referencing an invalid forward reference picture or referencing a missing forward reference picture.

* * * * *